(12) United States Patent
Nishi et al.

(10) Patent No.: US 11,224,839 B2
(45) Date of Patent: Jan. 18, 2022

(54) ALDEHYDE DECOMPOSITION CATALYST, AND EXHAUST GAS TREATMENT APPARATUS AND EXHAUST GAS TREATMENT METHOD

(71) Applicant: HITACHI ZOSEN CORPORATION, Osaka (JP)

(72) Inventors: Tsugumi Nishi, Osaka (JP); Susumu Hikazudani, Osaka (JP); Emi Shono, Osaka (JP)

(73) Assignee: HITACHI ZOSEN CORPORATION, Osaka (JP)

(*) Notice: Subject to any disclaimer, the term of this patent is extended or adjusted under 35 U.S.C. 154(b) by 7 days.

(21) Appl. No.: 16/773,310

(22) Filed: Jan. 27, 2020

(65) Prior Publication Data

US 2020/0156003 A1 May 21, 2020

Related U.S. Application Data

(62) Division of application No. 15/526,626, filed as application No. PCT/JP2015/081556 on Nov. 10, 2015, now abandoned.

(30) Foreign Application Priority Data

Nov. 12, 2014 (JP) .................. 2014-229692

(51) Int. Cl.
| | |
|---|---|
| *B01D 53/94* | (2006.01) |
| *B01D 53/90* | (2006.01) |
| *B01J 29/24* | (2006.01) |
| *B01J 29/76* | (2006.01) |
| *F01N 3/28* | (2006.01) |
| *F01N 3/08* | (2006.01) |
| *F01N 3/10* | (2006.01) |
| *B01D 53/86* | (2006.01) |

(52) U.S. Cl.
CPC ..... *B01D 53/9413* (2013.01); *B01D 53/8625* (2013.01); *B01D 53/8668* (2013.01); *B01D 53/90* (2013.01); *B01J 29/24* (2013.01); *B01J 29/76* (2013.01); *F01N 3/08* (2013.01); *F01N 3/10* (2013.01); *F01N 3/28* (2013.01); *B01D 53/9418* (2013.01); *B01D 2251/21* (2013.01); *B01D 2255/20761* (2013.01); *B01D 2255/50* (2013.01); *B01D 2257/708* (2013.01); *B01D 2258/012* (2013.01); *B01D 2258/06* (2013.01); *B01D 2259/4566* (2013.01)

(58) Field of Classification Search
None
See application file for complete search history.

(56) References Cited

U.S. PATENT DOCUMENTS

| | | | | |
|---|---|---|---|---|
| 4,934,142 | A * | 6/1990 | Hayashi ............. | B01D 53/9472 422/169 |
| 7,000,382 | B2 * | 2/2006 | Lee ....................... | B01D 53/90 423/239.1 |
| 8,894,952 | B1 * | 11/2014 | Choung ............. | B01D 53/9418 423/213.2 |
| 2001/0012820 | A1 * | 8/2001 | Nishijima ............. | B01J 20/186 502/401 |
| 2007/0286786 | A1 * | 12/2007 | Ikoma ..................... | B01J 29/26 423/239.2 |
| 2010/0196221 | A1 * | 8/2010 | Ando ...................... | B01J 23/42 422/171 |
| 2010/0274045 | A1 | 10/2010 | Armitage et al. | |
| 2011/0076229 | A1 | 3/2011 | Trukhan | |
| 2011/0113761 | A1 * | 5/2011 | Boorse .................... | F01N 3/035 60/297 |
| 2011/0305617 | A1 | 12/2011 | Lee et al. | |
| 2014/0219879 | A1 | 8/2014 | Bull et al. | |

FOREIGN PATENT DOCUMENTS

| | | |
|---|---|---|
| CN | 101903099 | 12/2010 |
| EP | 2072125 | 6/2009 |
| JP | 49-74660 | 7/1974 |
| JP | 7-171341 | 7/1995 |
| JP | 10-309443 | 11/1998 |
| JP | 2000-246112 | 9/2000 |
| JP | 2001-029748 | 2/2001 |
| JP | 2005-319393 | 11/2005 |
| JP | 2006-095395 | 4/2006 |
| JP | 2006-167493 | 6/2006 |
| JP | 5754734 | * 2/2011 |
| JP | 2012-517343 | 8/2012 |
| JP | 2013-226543 | 11/2013 |
| WO | 2013/146729 | 10/2013 |

OTHER PUBLICATIONS

Extended European Search Report EP Application No. 15858928.3 dated Jun. 21, 2018.
Notification of the First Office Action dated May 5, 2019 issued in corresponding Chinese Patent Application No. 201580060792.4 with English translation.
International Search Report PCT/JP2015/081556 dated Dec. 8, 2015 with English translation.

* cited by examiner

*Primary Examiner* — Sheng H Davis
(74) *Attorney, Agent, or Firm* — Pillsbury Winthrop Shaw Pittman, LLP

(57) ABSTRACT

One object is to provide a useful aldehyde decomposition catalyst, and an exhaust gas treatment apparatus and an exhaust gas treatment method using the aldehyde decomposition catalyst that achieve low cost and sufficient aldehyde decomposition performance with a small amount of the catalyst. An aldehyde decomposition catalyst of the present invention is made of a zeolite in a cation form $NH_4$ having a structure of CHA or MOR and carrying Cu.

4 Claims, 3 Drawing Sheets

ALDEHYDE DECOMPOSITION CATALYST, AND EXHAUST GAS TREATMENT APPARATUS AND EXHAUST GAS TREATMENT METHOD

CROSS-REFERENCE TO RELATED APPLICATIONS

The subject application is a Divisional Application of U.S. Ser. No. 15/526,626, filed May 12, 2017, which is the U.S. National Phase of PCT/JP2015/081556, filed Nov. 10, 2015, which in turn claims priority to Japanese Patent Application No. 2014-229692, filed Nov. 12, 2014. The entire contents of each of these applications are incorporated herein by reference in entirety.

TECHNICAL FIELD

The present invention relates to a catalyst for decomposing aldehydes such as formaldehyde in combustion exhaust gas, and an exhaust gas treatment apparatus and an exhaust gas treatment method using the aldehyde decomposition catalyst.

BACKGROUND

Nitrogen oxides may be included in various combustion exhaust gases from internal combustion engines such as diesel engines and gas engines and combustion facilities such as waste-incineration plants, boilers, and gas turbines and exhaust gases from industrial facilities. Some known methods for removing nitrogen oxides from combustion exhaust gases use alcohols as a reducing agent (e.g., Patent Literature 1).

However, when an alcohol is contacted with a catalyst made of a zeolite carrying a metal, which is commonly used for a denitration reaction for removing nitrogen oxides, oxidation of the alcohol occurs in addition to the target denitration reaction, and as a result, aldehydes are generated as an intermediate product in addition to CO and $CO_2$.

Aldehydes are harmful to many organisms, and among them, formaldehyde is highly toxic and causes irritation of the respiratory system, eyes, throat, skin and the like.

Catalysts capable of decomposing aldehydes such as formaldehyde are disclosed in Patent Literatures 2 and 3.

The catalyst disclosed in Patent Literature 2 is made of a zeolite selected from ZSM-5, faujasite, or mordenite, wherein the zeolite carries Pt. Use of this catalyst is costly because the carrier carries a noble metal Pt. In addition, the catalyst has to be used in a large amount to achieve sufficient aldehyde decomposition performance.

The catalyst disclosed in Patent Literature 3 is made of a zeolite selected from mordenite, ferrierite, ZSM-5, β-zeolite, Ga-silicate, Ti-silicate, Fe-silicate, or Mn-silicate, wherein the zeolite carries a noble metal selected from Ru, Rh, Pd, Ag, Os, Ir, Pt, or Au. Among them, those including Pd or Ag as a noble metal achieve a relatively high formaldehyde decomposition rate. However, as with the catalyst disclosed in Patent Literature 2, use of a noble metal increases the cost. In addition, a large amount of the catalyst is required to decompose aldehydes.

Further, Patent Literature 4 discloses a catalyst made of $TiO_2$ carrying an oxide of a metal selected from W, Mo, or V.

However, although the catalyst disclosed in Patent Literature 4 achieves high performance in decomposing formaldehyde at around 500° C. (the conversion rate is slightly less than 90%), the catalyst achieves insufficient decomposition performance below 500° C. That is, after various combustion exhaust gases and exhaust gases from industrial facilities are freed of nitrogen oxides using an alcohol as a reducing agent, the exhaust gases commonly have a temperature below 500° C. In such cases, the catalyst disclosed in Patent Literature 4 cannot be used.

By contrast, the catalysts disclosed in Patent Literatures 2 and 3 made of particular zeolites as a carrier achieve high performance in decomposing formaldehyde at a relatively low application temperature up to around 300° C., and can be used for treating aldehydes in exhaust gases described above.

However, these catalysts use expensive noble metals carried by a carrier, and the cost therefor is high.

Patent Literature 1: Japanese Patent Application Publication No. 2013-226543
Patent Literature 2: Japanese Patent Application Publication No. Hei 10-309443
Patent Literature 3: Japanese Patent Application Publication No. 2012-517343
Patent Literature 4: Japanese Patent Application Publication No. 2005-319393

SUMMARY

The present invention addresses the above problems, and one object of the present invention is to provide a useful aldehyde decomposition catalyst, and an exhaust gas treatment apparatus and an exhaust gas treatment method using the aldehyde decomposition catalyst, which substitute relatively inexpensive metals for expensive noble metals to lower the cost, and achieve sufficient aldehyde decomposition performance with a small amount of catalyst.

To overcome the above problems, an aldehyde decomposition catalyst of the present invention is made of a zeolite in a cation form $NH_4$ having a structure of CHA or MOR and carrying Cu.

When an alcohol is used as a reducing agent to remove nitrogen oxide that may be contained in various combustion exhaust gases from boilers, waste-incineration plants, diesel engines, gas engines, gas turbines, and the like and exhaust gases from industrial facilities, the combustion exhaust gases contain aldehydes such as formaldehyde. When the combustion exhaust gas is contacted with an aldehyde decomposition catalyst made of a zeolite in a cation form $NH_4$ having a structure of CHA or MOR and carrying Cu, oxidation occurs and the aldehydes can be converted into a harmless gas.

When an alcohol is used as a reducing agent to remove nitrogen oxide as described above, different aldehydes may be generated depending on the alcohol used. The aldehyde decomposition catalyst of the present invention can decompose any kind of aldehydes. Among them, it is particularly desirable to decompose formaldehyde having a high toxicity.

As described above, it was found in the present invention that an excellent aldehyde decomposition performance can be achieved when Cu, a relatively low-cost metal species, is carried instead of expensive noble metals.

The zeolite may be caused to carry Cu by any method, for example, the ion exchange method or impregnation method.

The temperature range of the combustion exhaust gas to which the present invention is applicable is not particularly limited but is advantageously from 200 to 600° C., and more advantageously from 200 to 400° C. The decomposition performance is higher as the reaction temperature is higher, but the temperature of the combustion exhaust gas is suitably up to 600° C., or more suitably up to 400° C. in consideration of the limit temperature of the combustion exhaust gas, the cost, and the like.

The aldehyde decomposition catalyst of the present invention described above may have any form as long as it can decompose aldehydes. For example, it may be in the form of pellet or honeycomb.

Advantages

The aldehyde decomposition catalyst of the present invention is made of a zeolite in a cation form $NH_4$ having a structure of CHA or MOR and carrying Cu, and can decompose aldehydes such as formaldehyde in a combustion exhaust gas into a harmless gas.

The aldehyde decomposition catalyst of the present invention described above has sufficient aldehyde decomposition performance in a temperature range of 200° C. and higher. Therefore, it can be applied to decomposition of aldehydes in a combustion exhaust gas having a relatively low temperature. In addition, even a small amount of this catalyst can decompose aldehydes.

Use of Cu reduces the cost since it is inexpensive as compared to expensive noble metals.

Further, the above aldehyde decomposition catalyst can be applied to exhaust gas treatment apparatus for exhaust gases discharged from internal combustion engines such as diesel engines and gas engines and combustion facilities such as waste-incineration plants, boilers, and gas turbines, so as to efficiently decompose aldehydes contained in the combustion exhaust gases and prevent, for example, formaldehyde, which is harmful and highly toxic to organisms, from being released.

DESCRIPTION OF EXAMPLE EMBODIMENTS

Embodiment 1

The aldehyde decomposition catalyst of the present invention will be hereinafter described in detail.

The aldehyde decomposition catalyst of the present invention is made of a zeolite in a cation form $NH_4$ having a structure of CHA or MOR and carrying Cu, and catalysts included in the present invention will be hereinafter described as Examples.

Example 1

Cu/CHA $NH_4$-CHA zeolite (ZD12002AC from Zeolyst International with a $SiO_2/Al_2O_3$ molar ratio of 30) that previously carries Cu was used.

Example 2

Cu/MOR

Ten grams of commercially available $NH_4$-MOR zeolite (HSZ-643NHA from Tosoh Corporation with a $SiO_2/Al_2O_3$ molar ratio of 18) was added to 200 mL of aqueous $Cu(NO_3)_2$ solution with a concentration of 0.1 M. The mixture was stirred at 80° C. for three hours and then subjected to filtration, cleansing, and drying at 110° C. over a night.

Comparative Example 1

Ten grams of commercially available $NH_4$-MFI zeolite (CBV2314 from Zeolyst International with a $SiO_2/Al_2O_3$ molar ratio of 23) was added to 200 mL of aqueous $AgNO_3$ solution with a concentration of 0.1 M. The mixture was stirred at 80° C. for three hours and then subjected to filtration, cleansing, and drying at 110° C. over a night.

Comparative Example 2

Zeolite species: commercially available H-ZSM-5(MFI) zeolite (CBV8020 from PQ Co. with a $SiO_2/Al_2O_3$ molar ratio of 70)
Aqueous metal solution: aqueous nitric acid solution of dinitro diamine platinum $[Pt(NH_3)_2(NO_3)_2]$
Catalyst: Pt/ZSM-5(MFI8030)

Comparative Example 3

Zeolite species: commercially available H-ZSM-5(MFI) zeolite (CBV3020 from PQ Co. with a $SiO_2/Al_2O_3$ molar ratio of 35)
Aqueous metal solution: aqueous nitric acid solution of dinitro diamine platinum $[Pt(NH_3)_2(NO_3)_2]$
Catalyst: Pt/ZSM-5(MFI3030)

Comparative Example 4

Zeolite species: commercially available mordenite zeolite (PQ511 from PQ Co. with a $SiO_2/Al_2O_3$ molar ratio of 12.8)
Aqueous metal solution: aqueous nitric acid solution of dinitro diamine platinum $[Pt(NH_3)_2(NO_3)_2]$
Catalyst: Pt/mordenite For Comparative Examples 2 to 4, the catalysts were prepared using the same zeolite species and aqueous metal solutions by the same method as disclosed in Japanese Patent Application Publication No. Hei 10-309443. The method of preparing the catalysts of Comparative Examples 2 to 4 was slightly different from the method of preparing the catalysts of Examples 1 to 2 and Comparative Example 1, but these two methods were essentially the same. Therefore, the results of the performance test of Examples 1 to 2 and Comparative Example 1 will now be compared with the results of the test disclosed in Japanese Patent Application Publication No. Hei 10-309443.

Catalyst Performance Test

Catalyst performance test was performed on the catalysts of Examples 1 to 2 and Comparative Example 1. The catalysts of Examples 1 to 2 and Comparative Example 1 were press-molded and then ground to mesh sizes 28 to 14.

Figure 1:
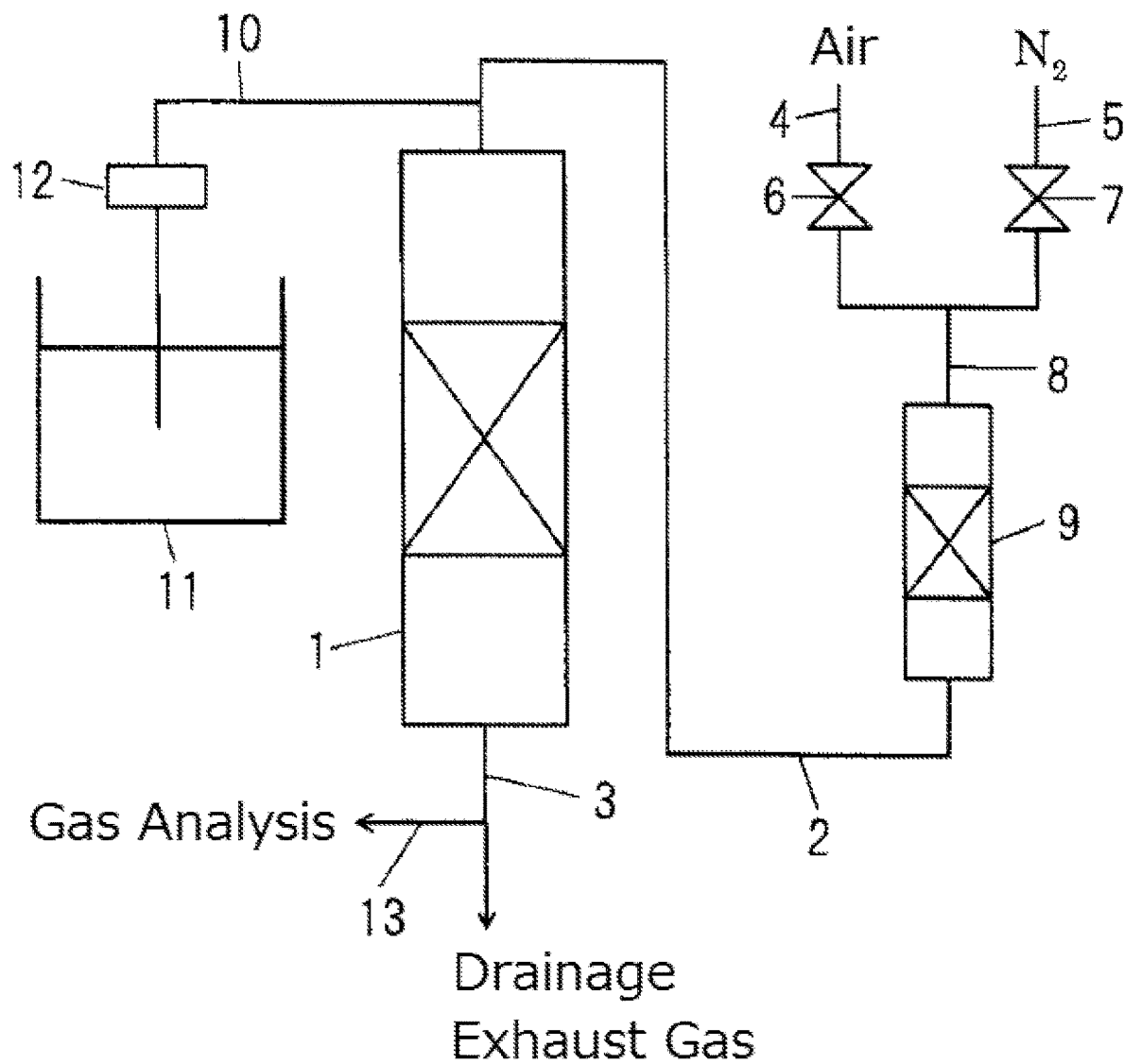
FIG. 1 is a flow chart showing a test apparatus used for catalyst performance tests of catalysts of Examples.

FIG. 1 is a flow chart of a test apparatus used for catalyst performance tests.

The catalyst obtained as described above was filled into a stainless reactor (1) having an inner diameter of 10.6 mm.

The reactor (1) filled with the catalyst may receive a test gas at an upper portion thereof through a line (2) and discharge the gas treated with the aldehyde decomposition catalyst at a lower portion thereof through a line (3).

The test gas received by the reactor (1) through the line (2) may be prepared by mixing the air from a line (4) with $N_2$ gas from a line (5). The line (4) and the line (5) may be provided with a valve (6) and a valve (7), respectively. The degree of opening of the valve (6) and the valve (7) can be adjusted to control the flow rate of respective gases, thereby to control the gas flow rate and the mixture ratio.

The mixed gas may be introduced into an upper portion of a heater (9) through a line (8), and the gas may be heated to a predetermined temperature and fed from a lower portion of the heater (9) to the reactor (1) through the line (2).

An aldehyde solution (a formaldehyde solution for this embodiment, hereinafter referred to as "the formaldehyde solution") may be fed to the upper portion of the reactor (1) through a line (10).

The formaldehyde solution to be introduced into the reactor (1) may be pumped up from a formaldehyde solution tank (11) by a liquid metering pump (12) and then merged from the line (10) into the line (2).

The treated gas discharged from the reactor (1) may be discharged out through the line (3), while partially fed to gas analysis through a line (13).

Table 1 shows the test conditions applied to the test performed with the test apparatus of FIG. 1.

TABLE 1

| Gas Component: $O_2$ | 14% |
|---|---|
| Gas Component: $N_2$ | Balance |
| Formaldehyde | 100 ppmvd |
| Moisture | 5% |
| Gas Flow Rate | 2 L/min |
| Amount of Catalyst | 1.0 g |
| Space Velocity (SV) | 120,000/h |
| Reaction Temperature | 250° C., 300° C. |

In Table 1, the term "Balance" indicates that $N_2$ is added such that the total gas composition is 100%, that is, the gas composition other than $O_2$, formaldehyde, and moisture is occupied by $N_2$.

In Table 1, the space velocity (SV) is a value equal to the amount of gas ($m^3$/h) to be treated flowing into the reactor divided by the volume ($m^3$) occupied by the reactor containing the catalyst. As this value is larger, the catalyst is contacted more efficiently.

The gas analysis was performed by measuring the outlet formaldehyde concentration with a gas test tube. Based on the measurements by the gas test tube, the decomposition rate indicating the formaldehyde decomposition performance of the catalyst was calculated from Formula (1) below.

$$\text{Decomposition Rate} = \frac{\text{Formaldehyde(in)} - \text{Formaldehyde(out)}}{\text{Formaldehyde (in)}} \times 100 \quad \text{Formula 1}$$

In Formula (1) above, formaldehyde (in) refers to the concentration of formaldehyde in the gas before introduction into the reactor (1), and formaldehyde (out) refers to the concentration of formaldehyde in the gas discharged from the reactor (1).

The numerical values to be compared will now be described before test results are presented.

For this embodiment, the space value SV is set at 120,000/h. In general, as the amount of catalyst is larger (SV is smaller), the catalyst achieves better performance. It is reasonable to expect that, when the values of the decomposition rate of Comparative Examples 2 to 4 for SV=100,000/h disclosed in the literature are converted into the values of the decomposition rate that would be obtained for SV=120,000/h, the decomposition performance will be degraded linearly. Therefore, the values disclosed in Japanese Patent Application Publication No. Hei 10-309443 that was obtained under the conditions of SV=100,000/h and 200° C. can be converted as in Table 2 below.

TABLE 2

|  |  | Decomposition Rate (%) | |
|---|---|---|---|
|  |  | 100,000/h | 120,000/h |
| Comparative Example 2 | Pt/MFI | 57.5 | 47.9 |
| Comparative Example 3 | Pt/MFI | 52.7 | 43.9 |
| Comparative Example 4 | Pt/MOR | 67.6 | 56.3 |

Therefore, it can be deemed from the comparison with the values converted from those disclosed in the literature that it would be possible to achieve about the same results as Comparative Examples 2 to 4 when decomposition rates of about 50% are obtained under the conditions of SV=120,000/h and a temperature of 200° C. or 250° C.

Table 3 shows the results of Examples 1 to 2 and Comparative Example 1.

TABLE 3

|  |  | Decomposition Rate (%) | |
|---|---|---|---|
|  |  | 250° C. | 200° C. |
| Example 1 | Cu/CHA | 85.3 | 70.4 |
| Example 2 | Cu/MOR | 75.5 | 65.5 |
| Comparative Example 1 | Ag/MFI | 51.1 | 51.1 |

Example 1 achieved excellent decomposition rates of 70.4% and 85.3% under the temperature conditions of 200° C. and 250° C., respectively, and Example 2 achieved excellent decomposition rates of 65.5% and 75.6% under the temperature conditions of 200° C. and 250° C., respectively.

By contrast, the catalyst of Comparative Example 1 achieved the decomposition rates exceeding 50% under the temperature conditions of both 200° C. and 250° C., but these decomposition rates did not largely exceed the value of 50% which constitutes a measure of decomposition rates and were about the same as those of the conventional catalysts.

As described above, the aldehyde decomposition catalyst of the present invention contains Cu, which is a relatively inexpensive metal, instead of expensive metals such as Pt. A small amount of this catalyst achieves better formaldehyde decomposition performance.

Embodiment 2

An Exhaust Gas Treatment Apparatus of a Marine Diesel Engine and an Exhaust Gas Treatment Method Using an Aldehyde Decomposition Catalyst An exhaust gas treatment apparatus of a marine diesel engine using the aldehyde decomposition catalyst according to the present invention will now be described with reference to FIG. 2.

Since a marine diesel engine runs on C fuel oil containing a sulfur component, the combustion exhaust gas thereof contains a sulfur oxide in addition to a nitrogen oxide. The combustion exhaust gas discharged from the diesel engine has a temperature of about 350° C. It is then discharged via a turbocharger and its temperature is reduced to about 200 to 300° C. When the combustion exhaust gas is denitrated by ammonia selective reduction, the sulfur oxide reacts with ammonia to generate ammonium sulfate that may deposit in an exhaust path to block the heat exchanger.

Since the cause of blocking of the heat exchanger resides in use of ammonia as a reducing agent, some methods substitute alcohol for ammonia as a reducing agent to overcome the problem of blocking. However, when alcohol is contacted with common denitration catalysts made of a zeolite carrying a metal, oxidation of alcohol occurs in addition to the denitration reaction. As a result, aldehydes are generated.

Embodiment 2 covers an exhaust gas treatment apparatus and an exhaust gas treatment method that use a small amount of catalyst to sufficiently decompose aldehydes, which is by-produced in denitration by denitration catalyst using alcohol as a reducing agent and contained in an exhaust gas having a low temperature of 200 to 300° C.

Figure 2:
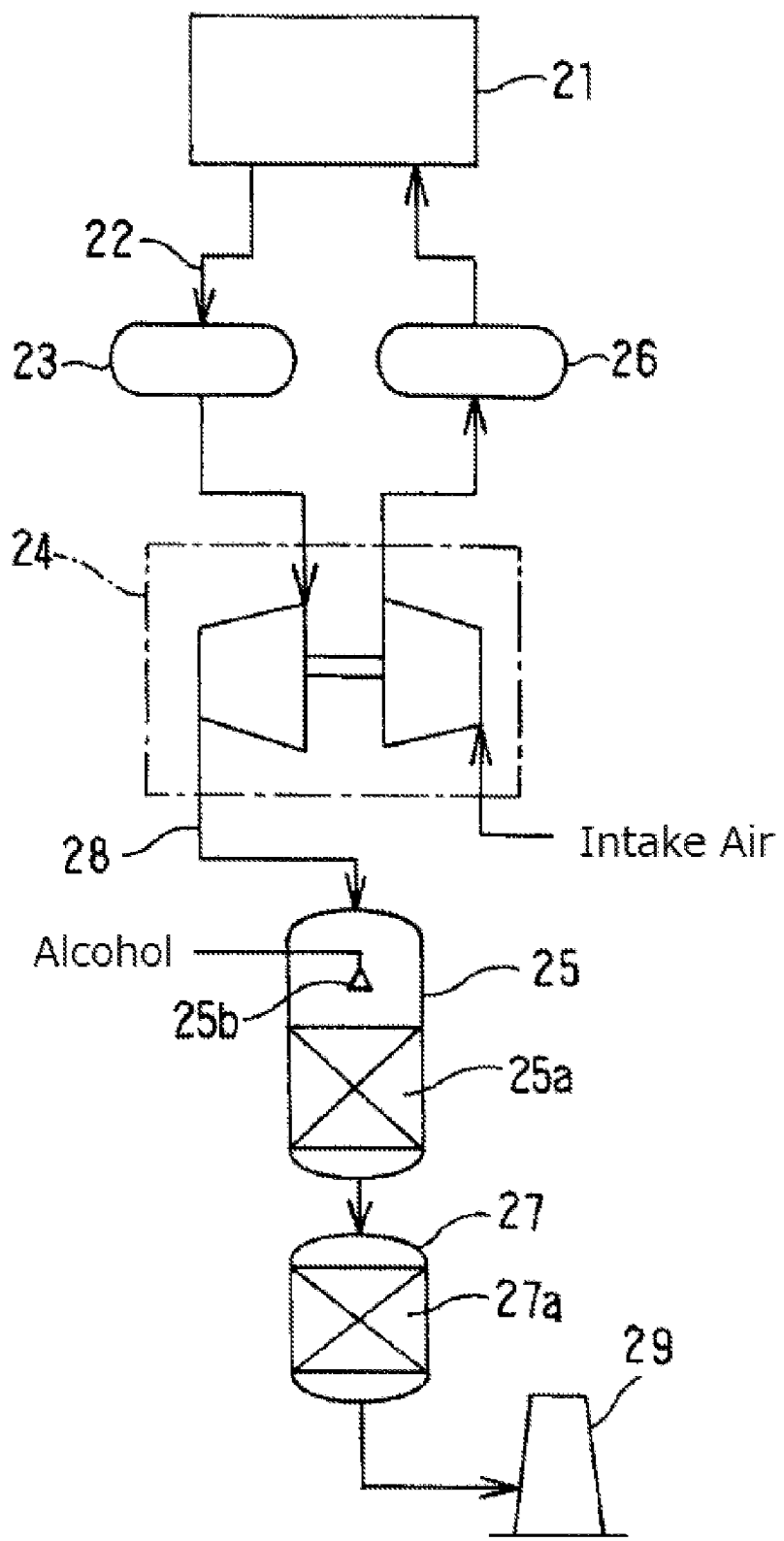
FIG. 2 is a block diagram showing an exhaust gas treatment apparatus of a marine diesel engine using an aldehyde decomposition catalyst.

As shown in FIG. 2, an exhaust gas having a temperature of about 350° C. may be discharged from combustion chambers of a diesel engine (21) and may be delivered from an exhaust pipe (22) to the turbine side of a turbocharger (24) via an exhaust reservoir tank (23). As a result of release of heat, the exhaust gas discharged from the turbocharger (24) via the exhaust gas path (28) may have a reduced temperature of about 200 to 300° C., and may be delivered to a denitration unit (25) including a denitration catalyst made of a zeolite carrying a metal. The pressurized air delivered from a compressor of the turbocharger (24) may be fed to combustion chambers of the diesel engine (21) via an air-supply reservoir tank (26).

In the denitration unit (25), an alcohol serving as a reducing agent may be injected into the exhaust gas from an injection nozzle (25b) provided at an exhaust gas inlet, and the exhaust gas may be contacted with a denitration catalyst (25a), such that oxidation of the alcohol occurs along with the denitration reaction so as to generate aldehydes. The exhaust gas discharged from the denitration unit (25) may be delivered to an aldehyde decomposition unit (27) serving as an aldehyde decomposition means. In the aldehyde decomposition unit (27), the exhaust gas may be contacted with the aldehyde decomposition catalyst (27a) of Embodiment 1, that is, the aldehyde decomposition catalyst (27a) made of a zeolite in a cation form $NH_4$ having a structure of CHA or MOR and carrying Cu. The aldehydes contained in the exhaust gas may be effectively decomposed, and then the exhaust gas may be discharged through an exhaust air chimney (29).

In summary, Embodiment 2 covers an exhaust gas treatment apparatus in which a combustion exhaust gas may be discharged from the diesel engine (21) and introduced into a denitration unit (25) via a turbocharger (24), the combustion exhaust gas may have a low temperature of 200 to 300° C., an alcohol serving as a reducing agent may be fed to the combustion exhaust gas, and the combustion exhaust gas may be contacted with a denitration catalyst for denitration. The exhaust gas treatment apparatus may further include an aldehyde decomposition unit (27) serving as an aldehyde decomposition means having an aldehyde decomposition catalyst for decomposing aldehydes contained in the combustion exhaust gas discharged from the denitration unit (25). The aldehyde decomposition catalyst may be made of a zeolite in a cation form $NH_4$ having a structure of CHA or MOR and carrying Cu.

Further, Embodiment 2 covers an exhaust gas treatment method in which a combustion exhaust gas may be discharged from the diesel engine (21) and introduced into a denitration unit (25) via a turbocharger (24), the combustion exhaust gas may have a low temperature of 200 to 300° C., an alcohol serving as a reducing agent may be fed to the combustion exhaust gas, and the combustion exhaust gas may be contacted with a denitration catalyst for denitration. The combustion exhaust gas discharged from the denitration unit (25) may be contacted with an aldehyde decomposition catalyst to decompose aldehydes contained in the combustion exhaust gas. The aldehyde decomposition catalyst may be made of a zeolite in a cation form $NH_4$ having a structure of CHA or MOR and carrying Cu.

Embodiment 2 covers a method including feeding an alcohol serving as a reducing agent to an exhaust gas discharged from a turbocharger (24) and having a low temperature of about 200 to 300° C. The exhaust gas may be contacted with a denitration catalyst to cause an oxidation reaction of the alcohol that may generate aldehydes, in addition to the denitration reaction. However, the aldehydes can be effectively decomposed by an aldehyde decomposition catalyst made of a zeolite in a cation form $NH_4$ having a structure of CHA or MOR and carrying Cu. Thus, it may be possible to prevent, for example, formaldehyde, which is harmful to organisms and highly toxic, from being released along with the combustion exhaust gas. The aldehyde decomposition catalyst of the present invention used for decomposing aldehydes has sufficient aldehyde decomposition performance in a temperature range of 200° C. and higher. Therefore, it can be applied to decomposition of aldehydes in a combustion exhaust gas having a relatively low temperature. In addition, even a small amount of this catalyst can decompose aldehydes. Use of Cu reduces the cost since it is inexpensive as compared to expensive noble metals.

Figure 3:
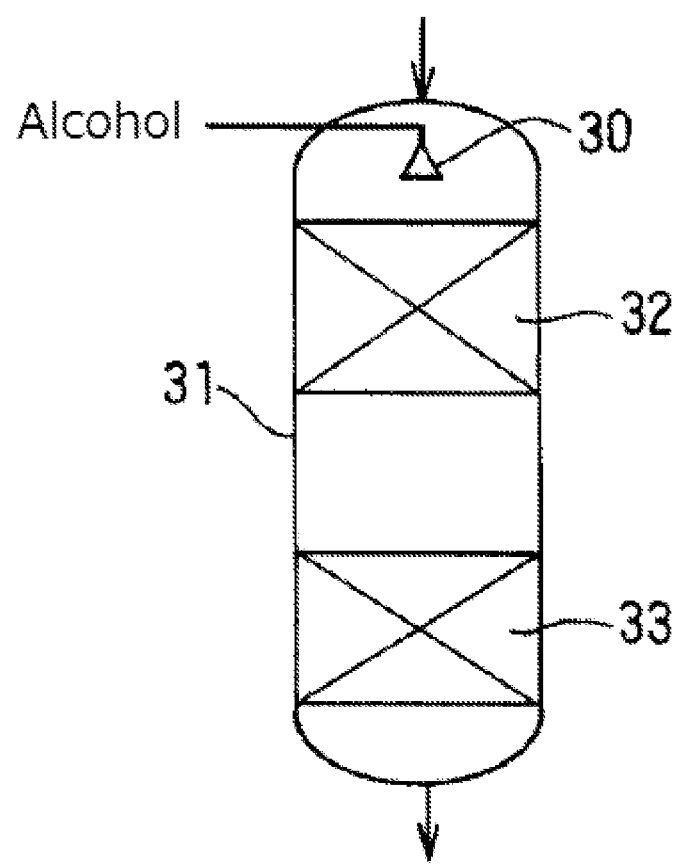
FIG. 3 is a block diagram showing a variation of the exhaust gas treatment apparatus.

In Embodiment 2, the denitration unit (25) arranged upstream in the exhaust gas path and the aldehyde decomposition unit (27) arranged downstream in the same are independent from each other. It may also be possible to arrange the denitration catalyst (32) upstream in an integrated container (31) and arrange the aldehyde decomposition catalyst (33), serving as an aldehyde decomposition means, downstream in the same, as shown in FIG. 3. The reference numeral (30) denotes an injection nozzle for alcohol.

The aldehyde decomposition catalyst (27a), (33) used in Embodiment 2 may be in any appropriate form such as powder, particle, granule (including spherical ones), pellet (cylindrical or annular ones), tablet, or honeycomb (monolithic body).

The foregoing was description of treatment apparatuses for a combustion exhaust gas discharged from marine diesel engines, the treatment apparatus using aldehyde decomposition catalyst. Combustion exhaust gas treatment apparatuses having essentially the same structure as the above-described treatment apparatuses can be used on land as treatment apparatuses for a combustion exhaust gas discharged from, for example, diesel engines installed in a power plant. Also, such combustion exhaust gas treatment apparatuses can be suitably applied to internal combustion engines such as dual fuel engines (DF engines) and gas engines. For the DF engines and the gas engines, it may be possible to denitrate exhaust gas discharged from, for example, a compressor of a turbocharger and having a temperature of about 200 to 300° C. Further, the combustion exhaust gas treatment apparatuses can be used for denitrating the combustion exhaust gas discharged from combustion facilities such as waste-incineration plants, boilers, and gas turbines.

What is claimed is:

1. A method for decomposing an aldehyde contained in a combustion exhaust gas discharged from a denitration unit, the denitration unit removing NOx from the combustion gas, the aldehyde being by-produced in the denitration unit to which an alcohol is fed as a reducing agent, the method comprising a step of contacting the aldehyde with an aldehyde decomposition catalyst, characterized in that the aldehyde decomposition catalyst is made of a zeolite in a cation form $NH_4$ having a structure of CHA and carrying Cu.

2. The exhaust gas treatment method according to claim 1, in which the temperature range of the combustion exhaust gas is from 200 to 400° C.

3. The exhaust gas treatment method according to claim 1, wherein the aldehyde contained in the combustion exhaust gas is formaldehyde.

4. A method for decomposing an aldehyde contained in a combustion exhaust gas discharged from a denitration unit, the denitration unit removing NOx from the combustion gas, the aldehyde being by-produced in the denitration unit to which an alcohol is fed as a reducing agent, the method comprising a step of contacting the aldehyde with an aldehyde decomposition catalyst, characterized in that the aldehyde decomposition catalyst is made of a zeolite in a cation form $NH_4$ having a structure of MOR and carrying Cu, wherein the aldehyde contained in the combustion exhaust gas is formaldehyde.

* * * * *